United States Patent
Panozzo et al.

(10) Patent No.: US 9,762,447 B2
(45) Date of Patent: Sep. 12, 2017

(54) NETWORK INFRASTRUCTURE MANAGEMENT

(71) Applicant: Panduit Corp., Tinley Park, IL (US)

(72) Inventors: Guy M. Panozzo, Tinley Park, IL (US); Oleg Rubin, Chicago, IL (US); Kevin Mooney, Aurora, IL (US); Steven Bytnar, Chicago, IL (US); Zeshun Cai, Skokie, IL (US)

(73) Assignee: Panduit Corp., Tinley Park, IL (US)

( * ) Notice: Subject to any disclaimer, the term of this patent is extended or adjusted under 35 U.S.C. 154(b) by 514 days.

(21) Appl. No.: 14/226,358

(22) Filed: Mar. 26, 2014

(65) Prior Publication Data

US 2014/0317277 A1     Oct. 23, 2014

Related U.S. Application Data

(60) Provisional application No. 61/806,247, filed on Mar. 28, 2013.

(51) Int. Cl.
*G06F 15/173*     (2006.01)
*H04L 12/24*     (2006.01)

(52) U.S. Cl.
CPC .......... *H04L 41/12* (2013.01); *H04L 41/022* (2013.01); *H04L 41/0853* (2013.01)

(58) Field of Classification Search
CPC .... H04L 41/12; H04L 41/0853; H04L 41/022
USPC .......................................... 709/224
See application file for complete search history.

(56) References Cited

U.S. PATENT DOCUMENTS

| 2010/0057827 A1* | 3/2010 | Tawfik | H04L 67/16 709/201 |
| 2011/0213866 A1* | 9/2011 | Yoshimura | H04L 41/0853 709/223 |

OTHER PUBLICATIONS

Remote Discovery for SysAid Releases, Mar. 28, 2013.
ManageEngine, Network Monitoring The Must Haves, Mar. 28, 2013.
Network Discovery Software for IT Management, Kaseya, Mar. 28, 2013.
Network Troubleshooting Tools, Tools for Network Engineers, solarwinds, Mar. 28, 2013.

* cited by examiner

*Primary Examiner* — Hee Soo Kim
(74) *Attorney, Agent, or Firm* — Christopher S. Clancy; James H. Williams; Christopher K. Marlow

(57) ABSTRACT

In one embodiment, the present invention is a network infrastructure management system that allows monitoring and controlling network devices while dynamically discovering them on demand during the process. New management protocols can be dynamically added to the system or built on demand without refactoring the existing algorithms.

1 Claim, 4 Drawing Sheets

NETWORK INFRASTRUCTURE MANAGEMENT

CROSS-REFERENCE TO RELATED APPLICATIONS

This application claims the benefit of U.S. Provisional Patent Application No. 61/806,247, filed on Mar. 28, 2013, which is incorporated herein by reference in its entirety.

BACKGROUND

Data Center, Enterprise, and Industrial Automation environments often include a collection of computers and other devices such as switches, routers, and Programmable Logical Controllers (PLCs). These devices are typically interconnected via cabling and wireless mechanisms allowing communication therebetween. As a whole, this collection of devices, its interconnections, and its communication mechanisms is referred to as a network. Communications protocols define the rules and data formats that govern the exchange of information on a computer network. Well-known communication protocols include Ethernet and internet protocol (IP) suite. IP addressing is a way for a device to have an identity on the network, and to send and receive messages across the network.

Network managers often desire to gather information about network devices reactively, and proactively control and change the logical and physical infrastructure environments. Network managers utilize a variety of software tools to detect, identify and collect information regarding the devices on their networks. Typically, managers run discovery tools first to identify devices connected to the network. Based on the obtained discovery information, managers run other tools that monitor and control the previously discovered devices. These tools usually work with predefined sets of one or more system management protocols, such as SNMP, WBEM (which can include, but is not limited to, CIM-XML), CIP, IPMI, etc., and don't allow dynamic addition of new protocols without refactoring algorithms.

In order to monitor and manage devices or to process alerts received from devices, known network management systems statically associate a device with a respective management protocol in advance. These systems are not capable of monitoring or managing a new device added to a network without preliminarily running a separate discovery process. The same is true when processing alerts received from a newly added device. The systems fail to process the alerts without knowing a device management protocol in advance.

Thus, there is a need for improved infrastructure management systems.

SUMMARY

Accordingly, embodiments of the present invention are directed towards improved infrastructure management systems and methods associated therewith.

In an embodiment, the present invention is a network infrastructure management system having a computer readable medium including a network infrastructure manager module, a management database module and a manager agent module, the manager agent module including a discovery engine and pluggable management protocols which interfaces with the discovery engine.

In another embodiment, the present invention a network infrastructure management apparatus having a processor, and a computer readable medium readable by the processor, the computer readable medium including a network infrastructure manager module, a management database module and a manager agent module, the manager agent module including a discovery engine and pluggable management protocols which interfaces with the discovery engine.

In yet another embodiment, the preset invention is a method of network infrastructure management, including the steps of dynamically discovering network devices within the network, monitoring the network devices, and controlling the network devices.

These and other features, aspects, and advantages of the present invention will become better-understood with reference to the following drawings, description, and any claims that may follow.

DETAILED DESCRIPTION

As used herein, a router can be defined as a computer networking device that forwards data packets between computer networks, creating an overlay internetwork. As used herein, network switch and switching hub can be defined as a computer networking device that connects network segments or network devices.

In one embodiment, the present invention is a network infrastructure management system that allows monitoring and controlling network devices while dynamically discovering them on demand during the process. New management protocols can be dynamically added to the system or built on demand without refactoring the existing algorithms. Accordingly, the system provides a platform for device discovery, monitoring, and management that dynamically adjusts to current environment.

The infrastructure management module provides information to a remote infrastructure management agent to be able to identify and communicate with devices located on the agent's network. The remote device information is collected and forwarded back to the infrastructure management module, including information about the devices, their current environment, and logical and/or physical location.

Figure 1:
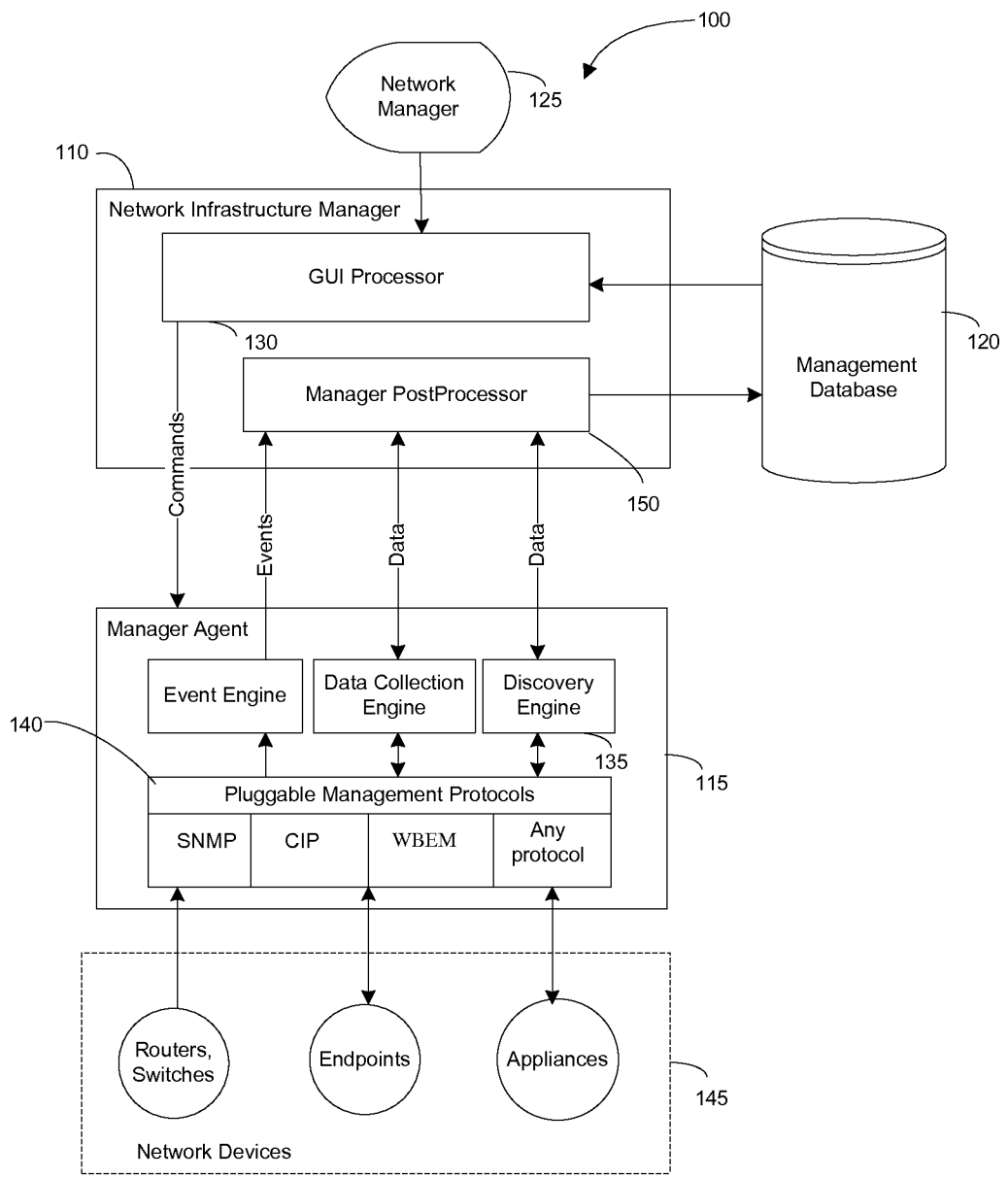
FIG. 1 is a schematic block diagram of a system according to an embodiment of the present invention.

Referring to FIG. 1, the network infrastructure management system includes three major components: (1) user-facing network infrastructure manager 110; (2) one or more device-facing remote manager agents 115; and (3) management database 120. A network manager 125 (e.g., an end user) uses a GUI processor 130 to view results of device monitoring, alerts generated by devices, and to send commands to manager agents. Commands may contain instructions to read and/or write data from one or more specified range of IPs associated with specific devices. Depending on the command contents, the command could be received by one of the manager agent's engines 135: either data collection or discovery. The engine access a network device(s) 145 by selecting one of the pluggable network management protocols 140, for example SNMP, CIP, WBEM (which can include, but is not limited to, CIM-XML), or others. The data obtained from the devices is then sent to a manager postprocessor 150. In some situations the devices 145 can also generate alerts and send them to the manager postprocessor 150. The manager postprocessor 150 works with the management database 120 and implements multiple functions, for example: validating received data, interpreting received alerts, building physical connectivity, and etc. The manager postprocessor 150 submits the data to the management database 120. Along with the collected data and received alerts, the management database 120 contains information about previously discovered devices and their management protocols.

The user 125 configures and starts discovery from a client workstation using a GUI. The GUI processor 130 renders infrastructure management configuration screens and graphically represents discovery results, data collection results, and event results by reading them from the management database 120. The user can start the infrastructure management discovery process by sending a discovery request directly from GUI or scheduling it to run automatically on a schedule. Upon receiving a discovery request, the discovery engine 135 selects an appropriate protocol driver from the collection (library) of the available pluggable management protocols 140, reads the discovery data from network devices 145, and sends it to the manager post processor 150. The manager post processor runs analysis on the discovered devices as a group. This allows for a production of additional artifacts, such as physical connectivity, automatic correction of discovery results, and potentially performing other activities. Finally, the manager post processor 150 writes the discovery data into the management database 120. The database can contain the discovered device information, system management protocol, and authentication and other parameters (such as event data and data collection data) for each device.

Figure 2:
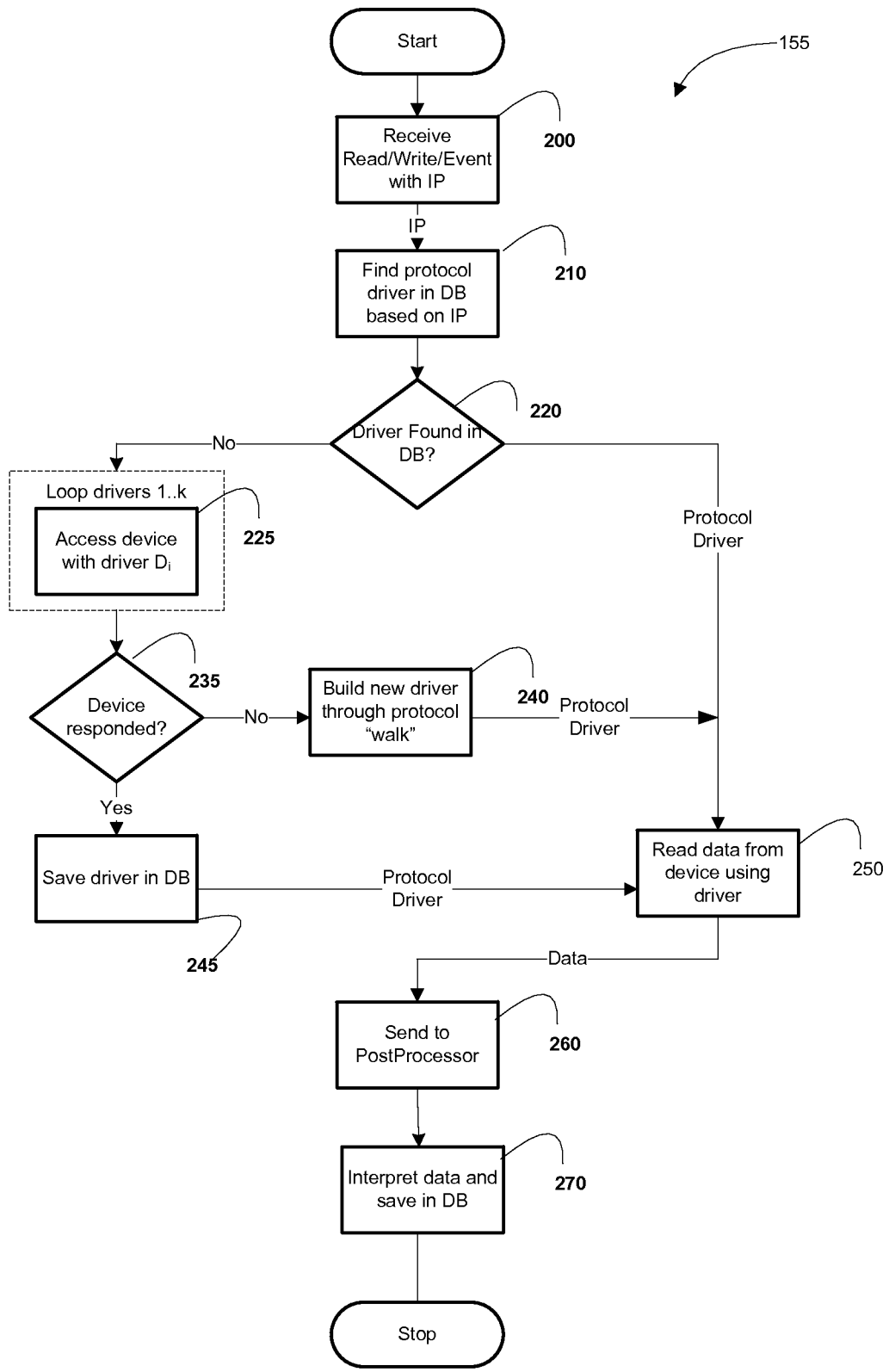
FIG. 2 is a flow chart of a method according to an embodiment of the present invention.

The method of network infrastructure management addressed in an embodiment of the present invention does not require statically associating a device with a predefined management protocol. Instead, the proposed method allows discovering a new device dynamically, on-demand without preliminarily associating the device with one of the predefined management protocols. The discovery process 155, shown in FIG. 2, starts from receiving either a read/write command from a Network Manager (end user) or an event generated by a device 200. The command or the event must contain at least a device IP address. Based on this IP address, the method attempts to find in the database a management protocol that was previously identified with the device 210. If, at 220, a corresponding IP address is found in the database, then a corresponding protocol is used to communication with a to-be-discovered device 250. If, on the other hand, no corresponding IP address is found in the database, the discovery agent probes the device with various protocols 225 until an appropriate protocol is found. Once an appropriate protocol is found, this information is saved in the database for potential later use 245. If, however, no acceptable protocol is found 235, the discovery agent builds a new protocol driver via a protocol walk 240. Once an appropriate driver has been found or once a driver has been built, the discovery agent proceeds to step 250 to read various information from the device being discovered. Upon obtaining the necessary information from a given device, this information is sent to a post-processor 260. The post-processor interprets the data as desired, saving the results in the database 270 in the process.

In an alternate embodiment, the discovery process starts by finding the IP address of the router that is the nearest to the network location of the Discovery Engine. It can use a local ARP (Address Resolution Protocol) table or other methods. If the discovery runs in "re-poll" mode, it finds the proper System Management Protocol and device Authentication Parameters from in the Management Database. Re-poll mode is only possible when the device was previously discovered and a corresponding protocol was identified. When the system management protocol is identified, the process accesses the device, reads the required discovery information, and sends it to the Discovery Post Processor. If the device is not a router the discovery moves to the next device in the IP address list. If the device is a router, the discovery reads the next hops (i.e., adjacent routers) and connected endpoints (i.e., all non-router devices connected to the router). The discovery obtains this information by reading different router's tables, such as a route table, ARP, and others. New hops and endpoint IP addresses are sent back to the discovery loop that repeats the same process for every new IP address found. The process stops when it cannot obtain new hops and endpoint IP addresses. The discovery process can automatically discover the entire network without any initial input from the end user. Instead of probing IP addresses in given range by sending ICMP ping in order to find network devices, the discovery process obtains this information directly from routers and avoids hitting non-existing devices. Re-poll mode eliminates redundant discoveries can improve the performance.

Figure 3:
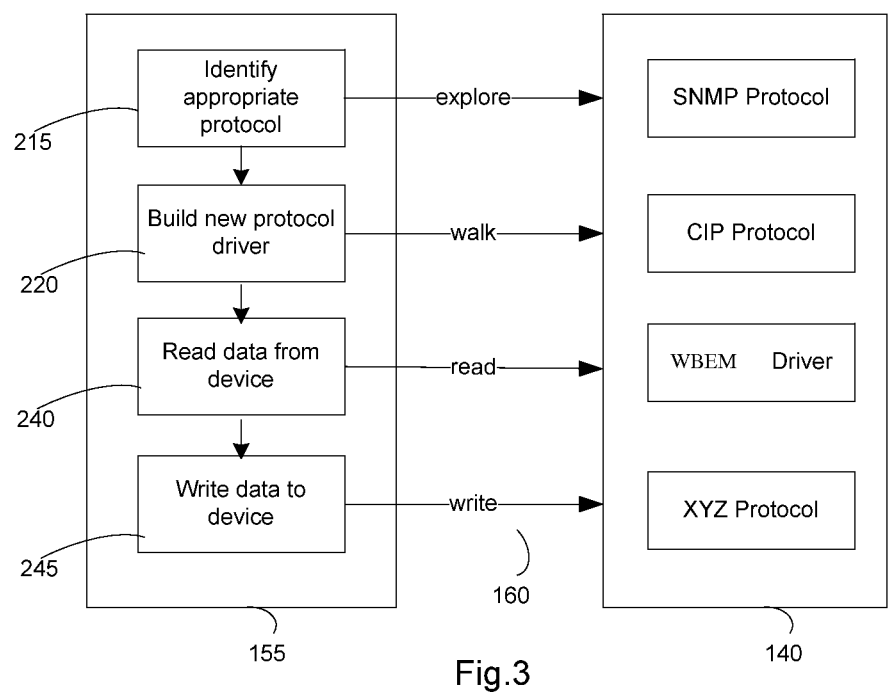
FIG. 3 is a block diagram illustrating an abstraction between a network management algorithm and pluggable management protocol drivers according to an embodiment of the present invention.

FIG. 3 illustrates abstraction and externalization of the discovery protocols. Protocol abstraction is achieved through establishing defined interfaces 160 between the discovery algorithm (and more specifically the point at which the algorithm needs to obtain data from a network device 155) and the selection and implementation of certain protocol drivers 140 to actually obtain the data. Based on its algorithm, the discovery system invokes a required interface when needed. Each interface method defines the protocol's purpose (i.e., what a specific protocol needs to do). Examples of such purposes include obtaining information related to device aliases, connected endpoints, and next hops from existing devices. The available protocol drivers 140 constitute an external protocol library that is independent from the discovery engine 135. As a result, a newly created protocol driver can be developed independently from the discovery engine 135 and used as a part of the discovery system without rebuilding the discovery engine.

Figure 4:
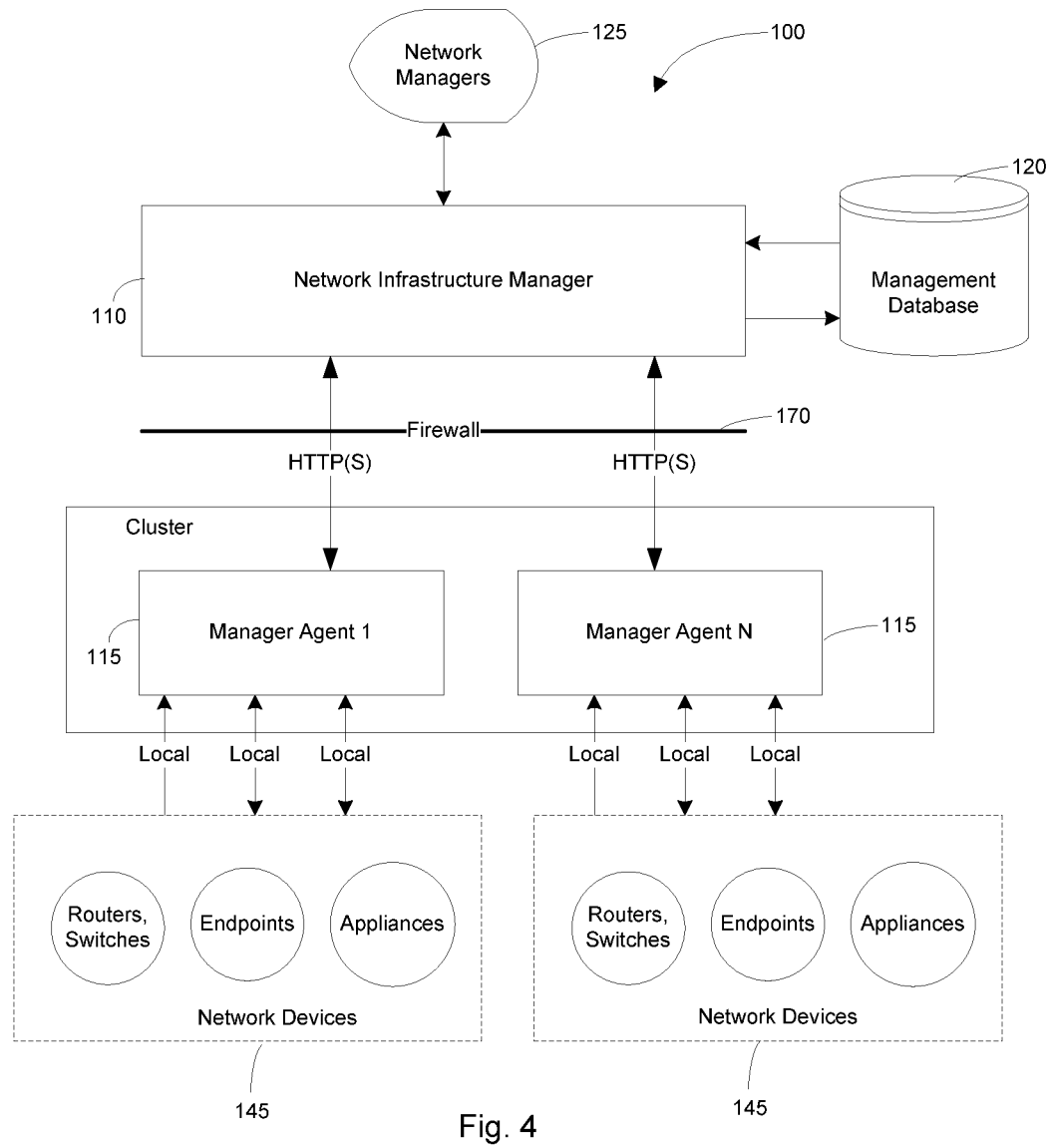
FIG. 4 is a schematic block diagram illustrating aspects of distributed architecture, horizontal scalability and redundancy according to an embodiment of the present invention.

In another embodiment of the present invention illustrated in FIG. 4, the discovery system 100 employs multiple discovery agents 115, that can be organized in a cluster for improved scalability, in communication with and under control of a single discovery server 110. The discovery server 110 is connected to the discovery database 120 and provides the network manager 125 with some form of an interface, such as a GUI. The individual discovery agents 115 can be located at various sites, with each agent discovering information related to devices that are present on each of the discovery agents' respective networks 145. The acquired network device data is in turn transmitted back to the discovery server for further processing and/or storage. The individual discovery agents 145 can communication with the discovery server 110 through a firewall 155 via the firewall-friendly protocols such as http/https. The discovery system of this embodiment can allow the discovery of devices in remote sites separated by firewalls from the main site while producing a holistic view of an enterprise network. In other embodiments, the present invention can be used in unidirectional networks.

In another embodiment, the present invention can offer different discovery methods. These methods can include network topology, subnet, and manager. In the network topology method, the discovery system finds network devices on a particular network that are not endpoints. In the subnet discovery method, the discovery system finds devices with routing capabilities and determines existing subnets (network segments). Every subnet discovery finds devices belonging to specified subnets. In the manager discovery method, the discovery system accesses a central point (software or hardware appliances) that manages multiple devices and discovers the network devices by reading information from the manager (central point) rather than accessing and reading each device separately. In another embodiment, the discovery system combines the above methods in any combination to automatically discover a network without initial identifying data input from the end user. In yet another embodiment, the DCM can choose a specific network segment on which he wishes to perform device discovery.

Furthermore, depending on the embodiment, the present invention may function as a stand-alone system, or it may be implemented as a module in other systems. For example, the present invention can be implemented as one module of a physical infrastructure management software.

In another embodiment, the present invention includes the ability to push management protocol plugins over the "Command" channel.

In another embodiment, the present invention can cluster agents to achieve unlimited scalability and redundancy.

Note that while this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

We claim:

1. A method of network infrastructure management, comprising the steps of:
dynamically discovering network devices within the network;
monitoring the network devices; and
controlling the network devices,
wherein the dynamically discovering step includes a first substep of determining if a management protocol driver has been successfully used to communicate with the network devices, wherein the dynamically discovering step further includes a second substep of looping through a plurality of the management protocol drivers if the determining step is not successful, and wherein the dynamically discovering step further includes a third substep of builds a new management protocol driver via a protocol walk if no acceptable management protocol driver is found in the second sub step.

* * * * *